(12) United States Patent
Yau

(10) Patent No.: US 6,240,799 B1
(45) Date of Patent: Jun. 5, 2001

(54) TRIANGULAR GIMBAL

(75) Inventor: Chi Lam Yau, Hampton, NH (US)

(73) Assignee: Hexel Corporation, Portsmouth, NH (US)

( * ) Notice: Subject to any disclaimer, the term of this patent is extended or adjusted under 35 U.S.C. 154(b) by 0 days.

(21) Appl. No.: 09/320,426

(22) Filed: May 26, 1999

Related U.S. Application Data

(60) Provisional application No. 60/086,715, filed on May 26, 1998.

(51) Int. Cl.[7] .............................. B25J 17/00; B25J 17/02; B25J 18/00
(52) U.S. Cl. ..................................... 74/490.03; 74/479.01; 901/22; 901/23
(58) Field of Search ................. 74/490–490.05, 74/490.07–490.08

(56) References Cited

U.S. PATENT DOCUMENTS 4,988,244 * 1/1991 Sheldon et al. ...................... 409/132
5,179,525 * 1/1993 Griffis et al. ........................ 364/512
5,401,128 * 3/1995 Lindem et al. ..................... 409/132
5,987,726 * 11/1999 Akeel ............................... 29/407.08
6,029,959 * 2/2000 Gran et al. ........................... 267/136
6,047,610 * 4/2000 Stocco et al. ..................... 74/479.01

* cited by examiner

Primary Examiner—Sherry Estremsky
Assistant Examiner—Tisha D. Lewis
(74) Attorney, Agent, or Firm—Pierce Atwood; Chris A. Caseiro; Edward J. Kelly

(57) ABSTRACT

A system and related method to enable six-axis movement of a structure. The system is related to hexapods, Stewart platforms and other mechanical movement systems. It includes a plurality of moveable supportive legs coupled to a platform. For the Stewart platform version of the system, there are six supportive legs, each of which connects to a triangular platform that acts as a base.

3 Claims, 3 Drawing Sheets

TRIANGULAR GIMBAL

Figure 1:
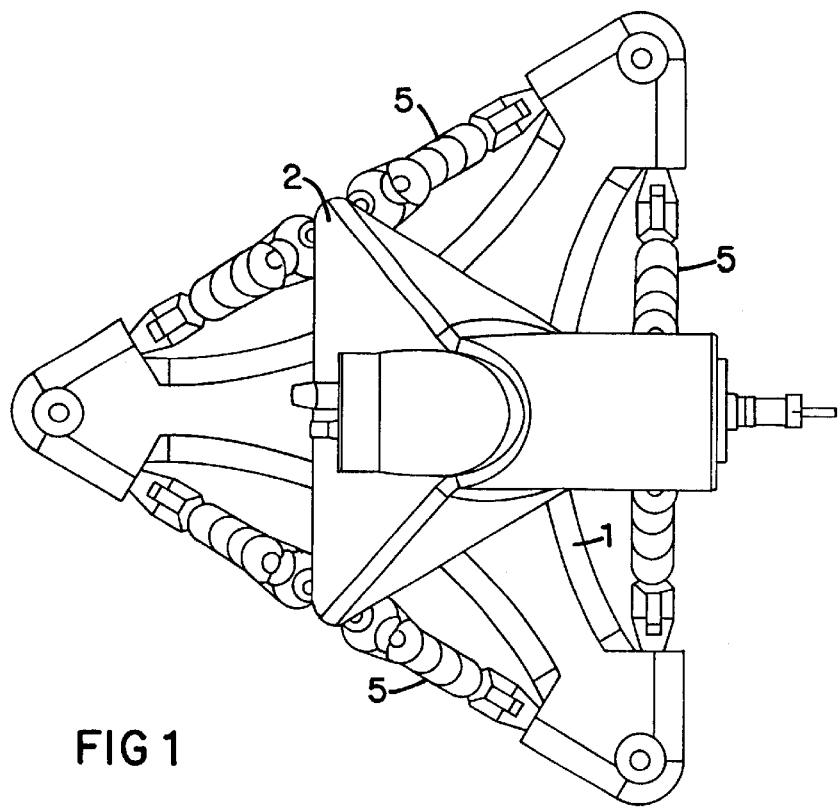

This application claims benefit to Provisional Application 60/086,715 filed May 26, 1998.

TECHNICAL FIELD

The invention relates to devices for manufacturing and machining, particularly devices that include a Stewart platform for positioning a tool in space.

BACKGROUND OF THE INVENTION:

High precision manufacturing and machining requires that the position of a tool be precisely known in space. One device developed to manipulate a tool with a high degree with accuracy is the Stewart platform. The Stewart platform, which is commonly incorporated into a hexapod manufacturing device, provides a point on the surface of a platform that can be moved with absolute certainty as long as the extension arms which move that platform have lengths which are accurately known. Therefore, the arms which are connected to the platform can be manufactured with conventional tolerances and then measured accurate. As long as the measurement made is accurate a simple equation can be employed to adjust the position of the platform and position a point on that platform at a precise and selected location. The design and operation of a type of hexapod manipulator is shown in U.S. Pat. No. 5,575,597, the teachings of which are incorporated by reference.

Although the hexapod structure works well, the arm assemblies are generally quite complex and therefore costly and difficult to manufacture. Accordingly, it is an object of the invention to provide systems and methods that provide an improved hexapod, and provide hexapod systems that are less expensive to manufacture.

Certain illustrative embodiments are provided herein for purposes of describing the systems and methods of the invention. The embodiments depicted are merely illustrative and are not to be understood as exhaustive or limiting in any way. Like reference numerals refer to like elements.

Figure 2:
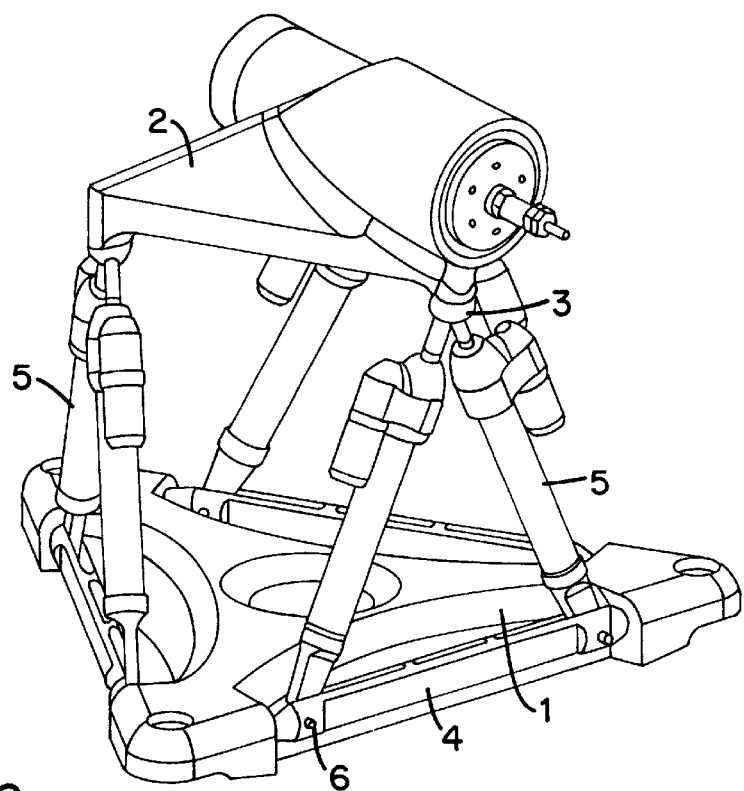
Figure 3:
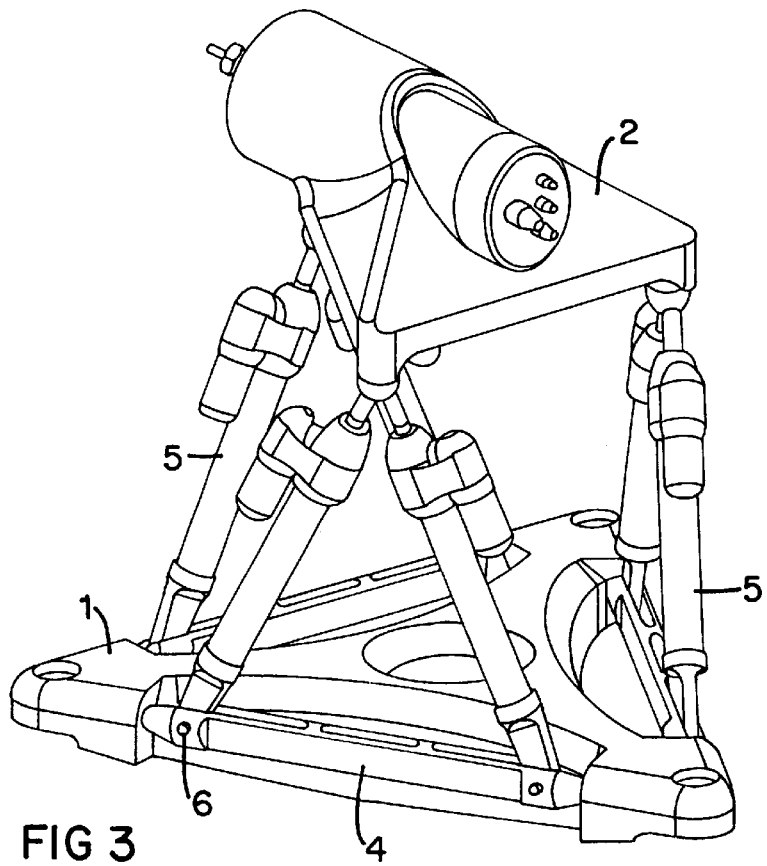
Figure 4:
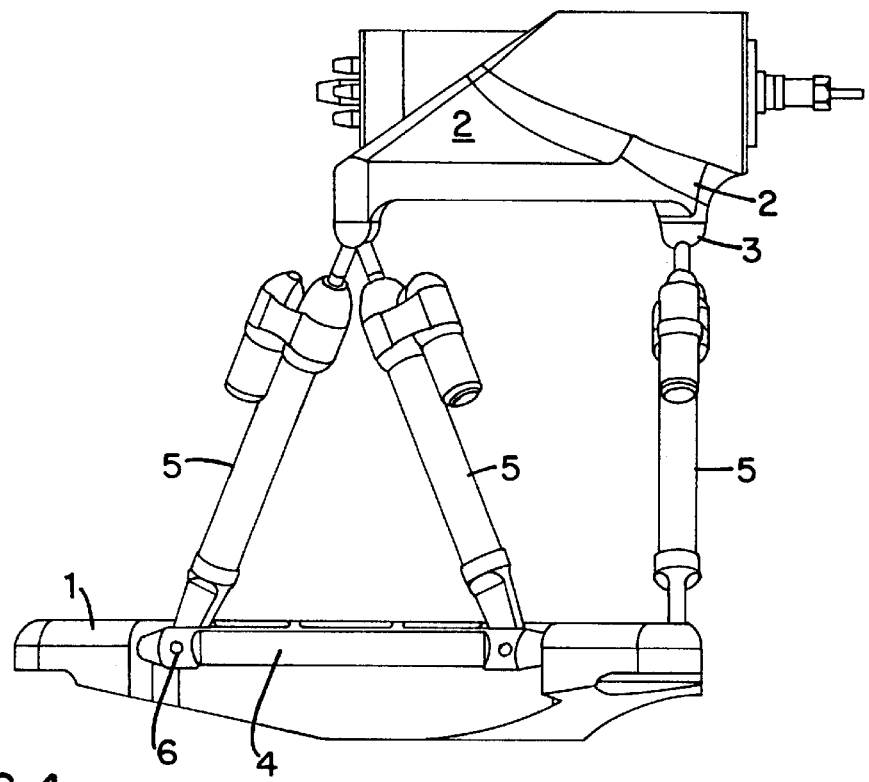
Figure 5:
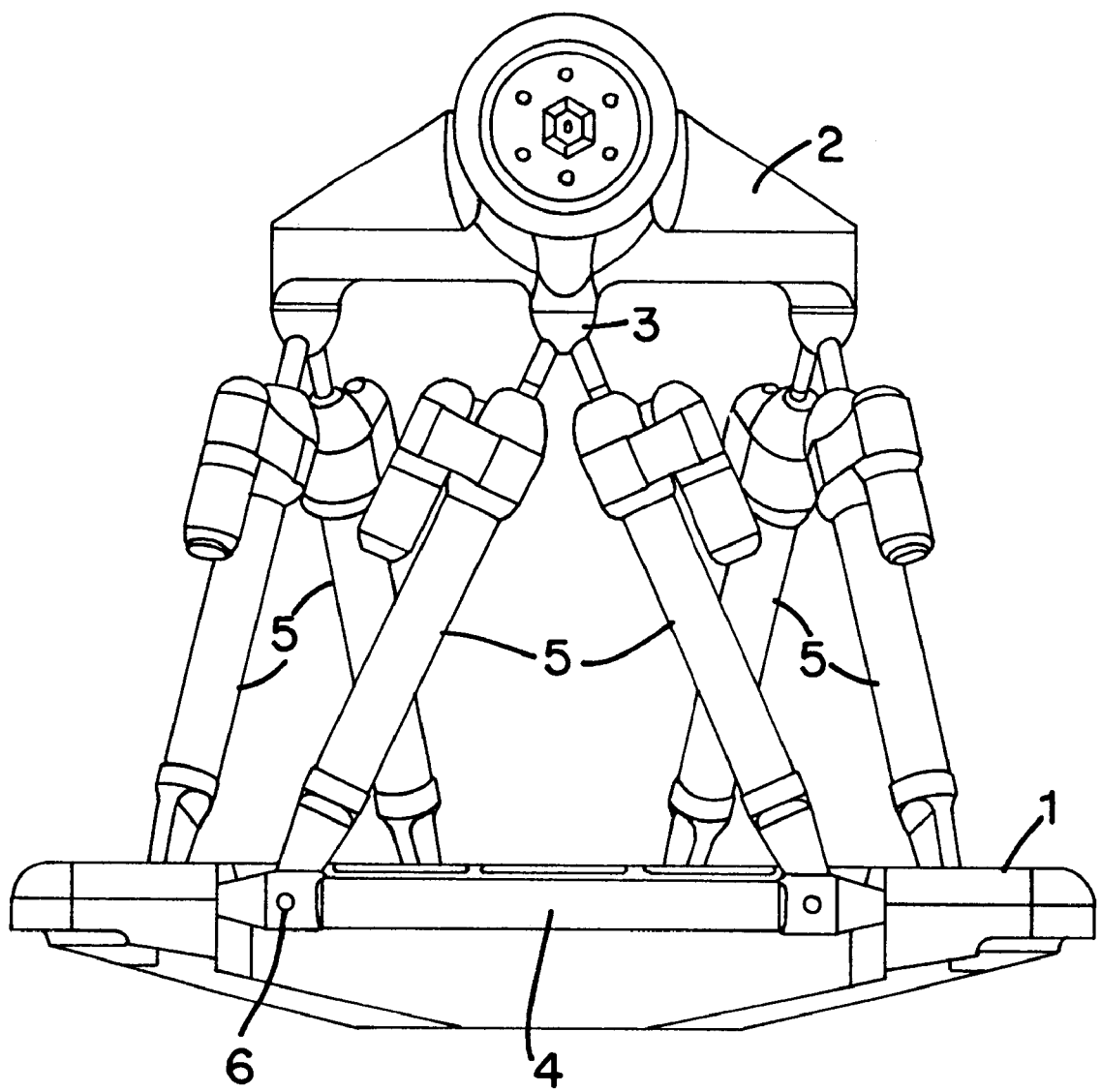

FIGS. 1–5 depict, from different perspectives, a system having triangular gimbals for positioning a platform in space. The illustrated system employs a new way to create the joints that support the platform and allows machines to be built at a reduced price and with reduced lead time.

BRIEF DESCRIPTION OF THE ILLUSTRATED EMBODIMENTS

The systems and methods described herein provide triangular gimbals capable of carrying and positioning a platform in space. One embodiment of such a system is depicted in FIGS. 1–5, which show a machine 10 that includes a base 1, a platform 2, six legs 5, and a tool 12. The legs 5 of the device 10 are paired together to provide three pairs of legs, with each pair of legs forming part of a triangular gimbal that also includes a ball joint 3 that joins to the two legs at one of its ends and that joins to the platform 2 at its other end. The triangular gimbal also includes the shaft 4 that connects to both of the legs 5. Each leg 5 is pinned to the shaft 4 to hold the pin at a select location along the shaft 4. The legs are held by the pin to the shaft 4, but are free to pivot about the pin. Moreover, the shaft 4 can mount to the base 1 by couplings that allow the shaft 4 to pivot about its longitudinal axis. In the depicted embodiment, the shaft 4 constrains one axis of rotation for the two attached legs 5, thereby causing the paired legs 5 to move together.

Each of the six legs 5 depicted in the Figures includes a side mounted motor and gear assembly 14 that turns a screw 16. As the screw turns, depending upon the direction of rotation, the screw extends from or retracts into the body of the leg 5. Therefore, by moving the screw 16 under the control of the motor and gear assembly 14, the effective length of the leg 5 can be altered. As shown, one end of the legs 5 is connected to a Platform 2, that moves as the legs 5 change in length. It is to be understood, that for any given set of six leg lengths there can be one known possible location of the movable platform. Accordingly, by changing and controlling the leg lengths, the platform can be moved through or to a known set of points in space. In one embodiment, the motor and gear assemblies can operate under the computer control for allowing programmable control each leg length and therefore, programmable control of the position and movement of the platform.

What is claimed is:

1. An apparatus for positioning and orienting an end-effector, comprising:
   a. a working surface suitable for carrying an end-effector;
   b. a base; and
   c. six actuator legs, wherein each of said actuator legs includes a proximal end and a distal end, wherein the proximal ends of said actuator legs are rotatably coupled to said base, wherein the distal ends of pairs of adjacent ones of said actuator legs are rotatably coupled together in a single point contact with said working surface, and wherein the proximal ends of said pairs of adjacent ones of said actuator legs are coupled together by a shaft such that the proximal ends of said pairs of adjacent ones are fixed with respect to one another.

2. The apparatus as claimed in claim 1 further comprising for each of said actuator legs a side-mounted motor coupled thereto and configured to cause linear actuation of the actuator leg to which it is coupled.

3. The apparatus as claimed in claim 1 wherein the proximal end of each of said actuator legs is coupled to a respective one of said shafts with a pin.

\* \* \* \* \*